United States Patent
Su et al.

(10) Patent No.: US 8,270,069 B2
(45) Date of Patent: Sep. 18, 2012

(54) UV LIGHT GENERATOR

(75) Inventors: Hsin-Chia Su, Yunlin County (TW);
 Chien-Ming Huang, Chiayi (TW);
 Yao-Wun Jhang, Chiayi (TW); Chih-Li Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 221 days.

(21) Appl. No.: 12/841,941

(22) Filed: Jul. 22, 2010

(65) Prior Publication Data
US 2011/0157684 A1   Jun. 30, 2011

(30) Foreign Application Priority Data
Dec. 28, 2009   (TW) ................................ 98145265 A

(51) Int. Cl.
 *G02F 1/37* (2006.01)
 *G02F 1/355* (2006.01)
(52) U.S. Cl. ........... 359/329; 359/328; 372/22; 372/101
(58) Field of Classification Search .......... 359/326–332; 372/21–22, 101, 105
 See application file for complete search history.

(56) References Cited

U.S. PATENT DOCUMENTS

| | | | |
|---|---|---|---|
| 6,002,695 A * | 12/1999 | Alfrey et al. ..................... | 372/22 |
| 6,590,911 B1 | 7/2003 | Spinelli et al. | |
| 6,633,594 B1 * | 10/2003 | Kiriyama et al. ................ | 372/22 |
| 6,741,620 B2 * | 5/2004 | Gerstenberger et al. ........ | 372/22 |
| 6,832,024 B2 * | 12/2004 | Gerstenberger et al. ........ | 385/37 |
| 7,385,752 B1 | 6/2008 | Starodoumov et al. | |
| 7,627,008 B2 * | 12/2009 | Park .............................. | 372/22 |
| 8,068,274 B2 * | 11/2011 | Mizushima et al. ........... | 359/326 |
| 2001/0036208 A1 * | 11/2001 | Zhou et al. ..................... | 372/21 |
| 2010/0278200 A1 * | 11/2010 | Dicks et al. .................... | 372/18 |

FOREIGN PATENT DOCUMENTS

TW   379888   1/2000
WO   WO 02065071 A2 *   8/2002

* cited by examiner

*Primary Examiner* — Daniel Petkovsek

(57) ABSTRACT

A UV light generator for receiving a baseband light beam from a baseband light source is provided. The UV light generator includes a first lens unit, a second lens unit, a first frequency doubling crystal and a second frequency doubling crystal. The baseband light beam from the baseband light source passes through the first lens unit. The first lens unit and the second lens unit control a minimum of baseband light spot position and a minimum of second harmonic light spot position. The first frequency doubling crystal is disposed between the first lens unit and the second lens unit, and located on the minimum of baseband light spot position. The second frequency doubling crystal is disposed between the first lens unit and the second lens unit, and located on the minimum of second harmonic light spot position.

20 Claims, 1 Drawing Sheet

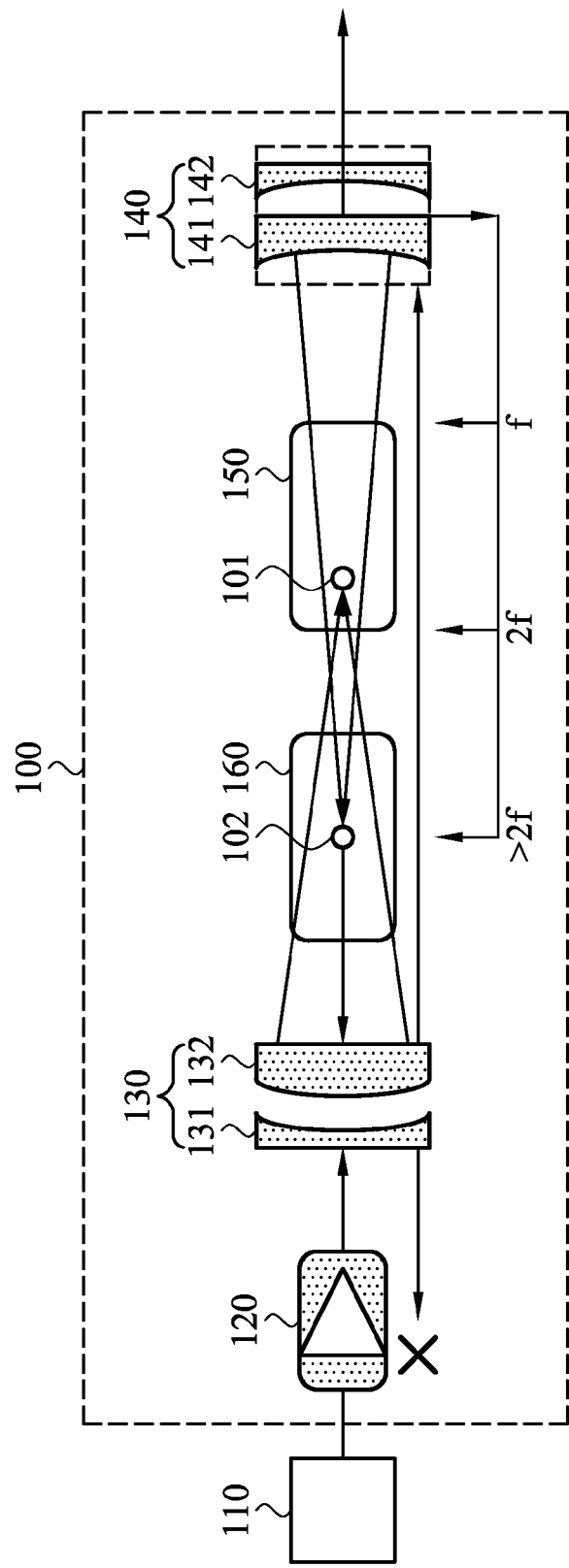

UV LIGHT GENERATOR

CROSS REFERENCE TO RELATED APPLICATIONS

This Application claims priority of Taiwan Patent Application No. 098145265, filed on Dec. 28, 2009, the entirety of which is incorporated by reference herein.

BACKGROUND

1. Technical Field

The present disclosure relates to a UV light generator, and in particular relates to a UV light generator generating a fourth harmonic light beam.

2. Related Art

A high-power UV laser is popularly utilized for precision machining or laser medical treatments. The photon of a high-power UV laser has great energy, and can break molecular bond easily. Thus, a high-power UV laser has better machining performance than a long-wavelength laser.

Conventionally, to generate a UV laser, first, an infrared laser is frequency doubled to a green light laser, and then a green light laser is frequency doubled to an UV laser. However, a large portion of the baseband light beam (infrared laser) is wasted during the described conversion.

SUMMARY

A detailed description is given in the following embodiments with reference to the accompanying drawings.

A UV light generator for receiving a baseband light beam from a baseband light source is provided. The UV light generator includes a first lens unit, a second lens unit, a first frequency doubling crystal and a second frequency doubling crystal. The baseband light beam from the baseband light source passes through the first lens unit. The first lens unit and the second lens unit control a minimum of baseband light spot position and a minimum of second harmonic light spot position. The first frequency doubling crystal is disposed between the first lens unit and the second lens unit, and located on the minimum of baseband light spot position, wherein the baseband light beam passes through the first frequency doubling crystal to become a second harmonic light beam. The second frequency doubling crystal is disposed between the first lens unit and the second lens unit, and located on the minimum of second harmonic light spot position.

Utilizing the UV light generator of the embodiment, the baseband light beam and the second harmonic light beam are repeatedly reflected (resonate) between the first lens unit and the second lens unit to be sufficiently absorbed thereby and to improve energy utility efficiency. Thus, optical energy utility rate is increased. Additionally, the first frequency doubling crystal is located on the minimum of baseband light spot position and the second frequency doubling crystal is located on the minimum of second harmonic light spot position, to increase UV light conversion efficiency.

BRIEF DESCRIPTION OF THE DRAWINGS

The present invention can be more fully understood by reading the subsequent detailed description and examples with references made to the accompanying drawings, wherein:

FIG. 1 shows a UV light generator in accordance with an embodiment.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

FIG. 1 shows a UV light generator 100 in accordance with an embodiment. The UV light generator 100 receives a baseband light beam from a baseband light source 110. The UV light generator 100 comprises a baseband optical isolator 120, a first lens unit 130, a second lens unit 140, a first frequency doubling crystal 150 and a second frequency doubling crystal 160. The baseband optical isolator 120 is disposed between the baseband light source 110 and the first lens unit 130 to prevent the baseband light beam from traveling back to the baseband light source 110. The baseband light beam is emitted from the baseband light source 110, and passes through the first lens unit 130. The first frequency doubling crystal 150 is disposed between the first lens unit 130 and the second lens unit 140 and located on the minimum of baseband light spot position 101. The baseband light beam travels from the first lens unit 130, and passes through the first frequency doubling crystal 150 to become a second harmonic light beam. The first lens unit 130 and the second lens unit 140 control a minimum of baseband light spot position 101 of the baseband light beam and a minimum of second harmonic light spot position 102 of the second harmonic light beam. Then, the second harmonic light beam is reflected by the second lens unit 140. The second frequency doubling crystal 160 is disposed between the first lens unit 130 and the second lens unit 140, and located on the minimum of second harmonic light spot position 102. The second harmonic light beam is reflected by second lens unit 140, and passes through the second frequency doubling crystal 160 to become a fourth harmonic light beam. The fourth harmonic light beam is reflected by the first lens unit 130, and passes through the second lens unit 140 to be output.

In the embodiment above, the light beams not absorbed by the first frequency doubling crystal 150 and the second frequency doubling crystal 160, are repeatedly reflected (resonate) between the first lens unit 130 and the second lens unit 140 to be sufficiently absorbed thereby and to improve energy utility rate.

The first frequency doubling crystal 150 is a green-light frequency doubling crystal (a frequency doubling crystal adapted for baseband light). The second frequency doubling crystal 160 is a purple-light frequency doubling crystal (a frequency doubling crystal adapted for second harmonic light).

The first lens unit 130 can comprise a baseband transparent film, a second harmonic reflective film and a fourth harmonic reflective film. The baseband light beam passes through the first lens unit 130, and the second harmonic light beam and the fourth harmonic light beam are reflected by the first lens unit 130. The first lens unit 130 has a baseband focal length to the baseband light beam and a second harmonic focal length to the second harmonic light beam, and the baseband focal length is greater than the second harmonic focal length.

The first lens unit 130 comprises an optical high-pass filter 131 and a convex lens 132. The curvature of the optical high-pass filter 131 is smaller than the curvature of the convex lens 132. The convex lens 132 controls the minimum of baseband light spot position 101 and the minimum of second harmonic light spot position 102. The fourth harmonic reflective film can be formed on the convex lens 132. Additionally, the second harmonic reflective film and the fourth harmonic reflective film can be formed on the optical high-pass filter 131. The baseband light beam and the second harmonic light beam are filtered or reflected by the optical high-pass filter 131, and are refracted or reflected by the convex lens 132.

The second lens unit 140 comprises a baseband reflective film, a second harmonic reflective film and a fourth harmonic transparent film. The fourth harmonic light beam passes through the second lens unit 140, and the baseband light beam and the second harmonic light beam are reflected by the second lens unit 140.

The second lens unit 140 comprises a concave lens 141 and a concave mirror 142. The second lens unit 140 has a baseband focal length to the baseband light beam, the second lens unit 140 has a second harmonic focal length to the second harmonic light beam, and the baseband focal length is smaller than the second harmonic focal length. The baseband light beam and the second harmonic light beam are refracted by the concave lens 141, and are reflected by the concave mirror 142.

The concave lens 141 controls the minimum of baseband light spot position 101 and the minimum of second harmonic light spot position 102. The fourth harmonic transparent film can be formed on the concave lens 141. The baseband reflective film, the second harmonic reflective film and the fourth harmonic transparent film can be formed on the concave mirror 142.

The first frequency doubling crystal 150 is made of LiNbO$_3$, LiIO$_3$, KTiOPO$_4$ or LiB$_3$O$_5$. The second frequency doubling crystal is made of LiNbO$_3$, LiIO$_3$, KTiOPO$_4$, LiB$_3$O$_5$ or β-BaB$_2$O$_4$.

The baseband optical isolator 120 is an optical isolator utilizing a Faraday rotation effect, a Fiber-Bragg grating, an optical filter, an optical coupler or a wavelength division multiplexer.

Utilizing the UV light generator 100 in accordance with an embodiment, the baseband light beam and the second harmonic light beam are repeatedly reflected (resonate) between the first lens unit 130 and the second lens unit 140 to be sufficiently absorbed thereby and to improve energy utility rate. Thus, optical energy utility rate is increased. Additionally, the first frequency doubling crystal is located on the minimum of baseband light spot position and the second frequency doubling crystal is located on the minimum of second harmonic light spot position, to increase UV light conversion efficiency.

While the embodiment has been described by way of example, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A UV light generator for receiving a baseband light beam from a baseband light source, comprising:
    a first lens unit, wherein the baseband light beam from the baseband light source passes through the first lens unit;
    a second lens unit;
    a first frequency doubling crystal, disposed between the first lens unit and the second lens unit, and located on the minimum of baseband light spot position, wherein the baseband light beam passes through the first frequency doubling crystal to become a second harmonic light beam, wherein the first lens unit and the second lens unit control a minimum of baseband light spot position of the baseband light beam and a minimum of second harmonic light spot position of the second harmonic light beam; and
    a second frequency doubling crystal, disposed between the first lens unit and the second lens unit, and located on the minimum of second harmonic light spot position,
    wherein the first lens unit comprises a baseband transparent film, a second harmonic reflective film and a fourth harmonic reflective film,
    wherein the first lens unit has a baseband focal length to the baseband light beam, the first lens unit has a second harmonic focal length to the second harmonic light beam, and the baseband focal length is greater than the second harmonic focal length,
    wherein the second lens unit has a baseband focal length to the baseband light beam, the second lens unit has a second harmonic focal length to the second harmonic light beam, and the baseband focal length is smaller than the second harmonic focal length,
    wherein the second lens unit comprises a baseband reflective film, a second harmonic reflective film and a fourth harmonic transparent film.

2. The UV light generator as claimed in claim 1, wherein the first frequency doubling crystal is a frequency doubling crystal adapted for baseband light.

3. The UV light generator as claimed in claim 1, wherein the second frequency doubling crystal is a frequency doubling crystal adapted for second harmonic light.

4. The UV light generator as claimed in claim 1, wherein the first lens unit comprises an optical high-pass filter and a convex lens.

5. The UV light generator as claimed in claim 4, wherein the curvature of the optical high-pass filter is smaller than the curvature of the convex lens.

6. The UV light generator as claimed in claim 1, wherein the second lens unit comprises a concave lens and a concave mirror.

7. The UV light generator as claimed in claim 1, wherein further comprising a baseband optical isolator, disposed between the baseband light source and the first lens unit.

8. The UV light generator as claimed in claim 7, wherein the baseband optical isolator is an optical isolator utilizing a Faraday rotation effect, a Fiber-Bragg grate, an optical filter, an optical coupler or a wavelength division multiplexer.

9. The UV light generator as claimed in claim 1, wherein the first frequency doubling crystal is made of LiNbO$_3$, LiIO$_3$, KTiOPO$_4$ or LiB$_3$O$_5$.

10. The UV light generator as claimed in claim 1, wherein the second frequency doubling crystal is made of LiNbO$_3$, LiIO$_3$, KTiOPO$_4$, LiB$_3$O$_5$ or β-BaB$_2$O$_4$.

11. A UV light generator for receiving a baseband light beam from a baseband light source, comprising:
    a first lens unit, wherein the baseband light beam from the baseband light source passes through the first lens unit;
    a first frequency doubling crystal, wherein the baseband light beam from the first lens unit passes through the first frequency doubling crystal to become a second harmonic light beam;
    a second lens unit, reflecting the second harmonic light beam; and
    a second frequency doubling crystal, wherein the second harmonic light beam reflected by the second lens unit passes through the second frequency doubling crystal to become a fourth harmonic light beam,
    wherein the first lens unit comprises a baseband transparent film, a second harmonic reflective film and a fourth harmonic reflective film, wherein the baseband light beam and the second harmonic light beam are filtered or reflected by the optical high-pass filter, and are refracted or reflected by the convex lens, wherein the first lens unit has a baseband focal length to the baseband light beam, the first lens unit has a second harmonic focal length to the second harmonic light beam, and the baseband focal length is greater than the second harmonic focal length, wherein the baseband light beam and the second harmonic light beam are refracted by the concave lens, and are reflected by the concave mirror, wherein the second lens unit has a baseband focal length to the baseband light beam, the second lens unit has a second harmonic focal length to the second harmonic light beam, and the baseband focal length is smaller than the second harmonic focal length, wherein the second lens unit comprises a baseband reflective film, a second harmonic reflective film and a fourth harmonic transparent film.

12. The UV light generator as claimed in claim 11, wherein the first frequency doubling crystal is a frequency doubling crystal adapted for baseband light.

13. The UV light generator as claimed in claim 11, wherein the second frequency doubling crystal is a frequency doubling crystal adapted for second harmonic light.

14. The UV light generator as claimed in claim 11, wherein the first lens unit comprises an optical high-pass filter and a convex lens.

15. The UV light generator as claimed in claim 14, wherein the curvature of the optical high-pass filter is smaller than the curvature of the convex lens.

16. The UV light generator as claimed in claim 11, wherein the second lens unit comprises a concave lens and a concave mirror.

17. The UV light generator as claimed in claim 11, wherein further comprising a baseband optical isolator, disposed between the baseband light source and the first lens unit.

18. The UV light generator as claimed in claim 17, wherein the baseband optical isolator is an optical isolator utilizing a Faraday rotation effect, a Fiber-Bragg grating, an optical filter, an optical coupler or a wavelength division multiplexer.

19. The UV light generator as claimed in claim 11, wherein the first frequency doubling crystal is made of $LiNbO_3$, $LiIO_3$, $KTiOPO_4$ or $LiB_3O_5$.

20. The UV light generator as claimed in claim 11, wherein the second frequency doubling crystal is made of $LiNbO_3$, $LiIO_3$, $KTiOPO_4$, $LiB_3O_5$ or $\beta\text{-}BaB_2O_4$.

* * * * *